United States Patent [19]

Virta et al.

[11] Patent Number: 4,528,928
[45] Date of Patent: Jul. 16, 1985

[54] CABIN ELEMENT SYSTEM FOR SHIPS

[75] Inventors: Hannu Virta, Turku; Joachim Gräsbeck, Helsinki; Tapio Ritvanen, Somersoja, all of Finland

[73] Assignee: Oy Wartsila Ab, Helsinki, Finland

[21] Appl. No.: 313,331

[22] Filed: Oct. 20, 1981

[30] Foreign Application Priority Data

Oct. 24, 1980 [FI] Finland .................................. 803333

[51] Int. Cl.³ .............................................. B63B 29/02
[52] U.S. Cl. ................................... 114/189; 52/79.7; 114/77 R
[58] Field of Search ................... 114/65 R, 71, 77 R, 114/77 A, 189, 259, 344; 52/79.1-79.9

[56] References Cited

U.S. PATENT DOCUMENTS

| | | | |
|---|---|---|---|
| 2,049,702 | 8/1936 | Howe | 114/344 |
| 2,079,635 | 5/1937 | Sharp | 114/71 |
| 2,398,274 | 4/1946 | Albert | 114/259 |
| 3,363,597 | 1/1968 | Zeien | 114/65 R |
| 3,371,639 | 3/1968 | Schillreff | 114/77 A |
| 3,648,639 | 3/1972 | French | 114/65 R |
| 4,091,581 | 5/1978 | Abbott | 52/79.1 |

FOREIGN PATENT DOCUMENTS 68111  12/1948  Denmark .......................... 52/79.7

Primary Examiner—Jesus D. Sotelo
Attorney, Agent, or Firm—McAulay, Fields, Fisher, Goldstein & Nissen

[57] ABSTRACT

A method for providing a floating structure with self-supporting box-like cabin elements. A deck or the like is prepared for receiving the cabin elements, which are built up with walls and a roof and with an open bottom. Transport units, by which the cabin elements are movable on the deck, are temporarily attached to the cabin elements below and inside their walls.

19 Claims, 8 Drawing Figures

CABIN ELEMENT SYSTEM FOR SHIPS

FIELD OF THE INVENTION

This invention relates to a method for providing a ship or the like with self-supporting box-like cabin elements.

In the ship building industry, the outfitting of a ship is more and more carried out in advance, outside the ship. Thereby certain entities, for instance, standard-size pre-fabricated units, can be provided with necessary installations prior to the transfer of the unit to the ship. This speeds up the building of the ship considerably.

PATENT INFORMATION DISCLOSURE

It is known to transfer prefabricated, partly or fully outfitted units to a ship for building up a passenger compartment. U.S. Pat. No. 3,363,597 discloses the use of prefabricated space elements comprising several cabins. The space elements are mounted in a rigid matrix of girders to form several floors, whereby the elements rest on the girders. Thus, the units of the lower levels are difficult to install. The units being at a corner of the girder matrix are supported by the girders at two sides only. Thus the mounting of the units is, in this known construction, rather complicated.

Swedish Patent Specification No. 377 681 shows a container ship with a removable and reassemblable passenger compartment made of cabin containers instead of usual goods containers. The containers are connected by means of temporary arrangements to heating, water, air conditioning and electrical networks present in the ship. The units are lowered into the passenger compartment through openings in the upper deck, but the assembly method is not described in detail. Obviously, the aim is to form a temporary arrangement useable as a passenger compartment. Thus, a great number of special solutions and arrangements are needed, which are complicated and not suitable for a stationary passenger compartment.

OBJECTS AND SUMMARY OF THE INVENTION

One object of the invention is to provide a simple method for providing a ship with cabin elements to form a stationary passenger compartment. Another object is to provide a rationalized and economical system by using pre-fabricated entities.

The invention is characterized in that a deck or a similar even surface is prepared for receiving cabin elements, that the cabin elements are built up with walls and a roof and with an open bottom suitable for temporary attachment of transport units by means of which the cabin elements are movable on deck or surface. By making the cabin elements self-supporting and by mounting them on an even support, such as the ship's deck, sufficient strength is obtained without auxiliary stiffeners. The movement of a bottomless unit to its proper place can be carried out, for instance, by pushing the unit from its free interior. Thereby the units are easily transferred even to narrow sites. A cabin element can be provided with stiffening partial bottom elements. For instance, there can be elements protruding inwardly from the lower portions of the walls. A cabin element can also be provided with temporary devices for storage and transport. Temporarily attached transfer devices are economical since they can be reused.

By making the roof and/or the walls of the cabin elements of cassette-like plate members having spaced-apart plate surfaces between which a suitable, relatively stiff insulation material is inserted, a sufficient rigidity is obtained in an economical way. By standardizing the members further savings can be obtained. The members can be attached to a rigid frame of the cabin element.

A cabin element can be provided in advance with stationary pieces of furniture and other fixtures. Such furniture and other fixtures have a certain rigidity. This property is, according to the invention, made use of by attaching the furniture and other fixtures to the cabin element walls in such a way, that they increase the structural stiffness of the cabin element.

The temporarily attached transport units should preferably extend, in the horizontal direction, only slightly or not at all outside the cabin element. A cabin element can easily be supported by such transport units. Every transport unit comprises at least one wheel, an air cushion device or the like. for the installation and the control of the transport units. Also the changing of transport units can take part through the interior of cabin element.

In order to have a cabin element firmly supported by transport units, these units are preferably arranged at the cabin element corners. If a cabin element is to be transferred by means of an air cushion device, the cabin element is provided with a cover over the open bottom portion, under which cover an air cushion is formed. The cover may be attached to the lower edge of the cabin element walls.

A cabin element can be provided with a lavatory unit, which according to sanitary regulations has its own bottom. The lavatory unit is so attached to the cabin element, that it increases the stiffness of the cabin element, thereby increasing the strength of the total assembly.

BRIEF DESCRIPTION OF THE DRAWING

In the following, the present invention is described in greater detail. with reference to the attached drawing, in which.

DESCRIPTION OF BEST MODE

Figure 1:
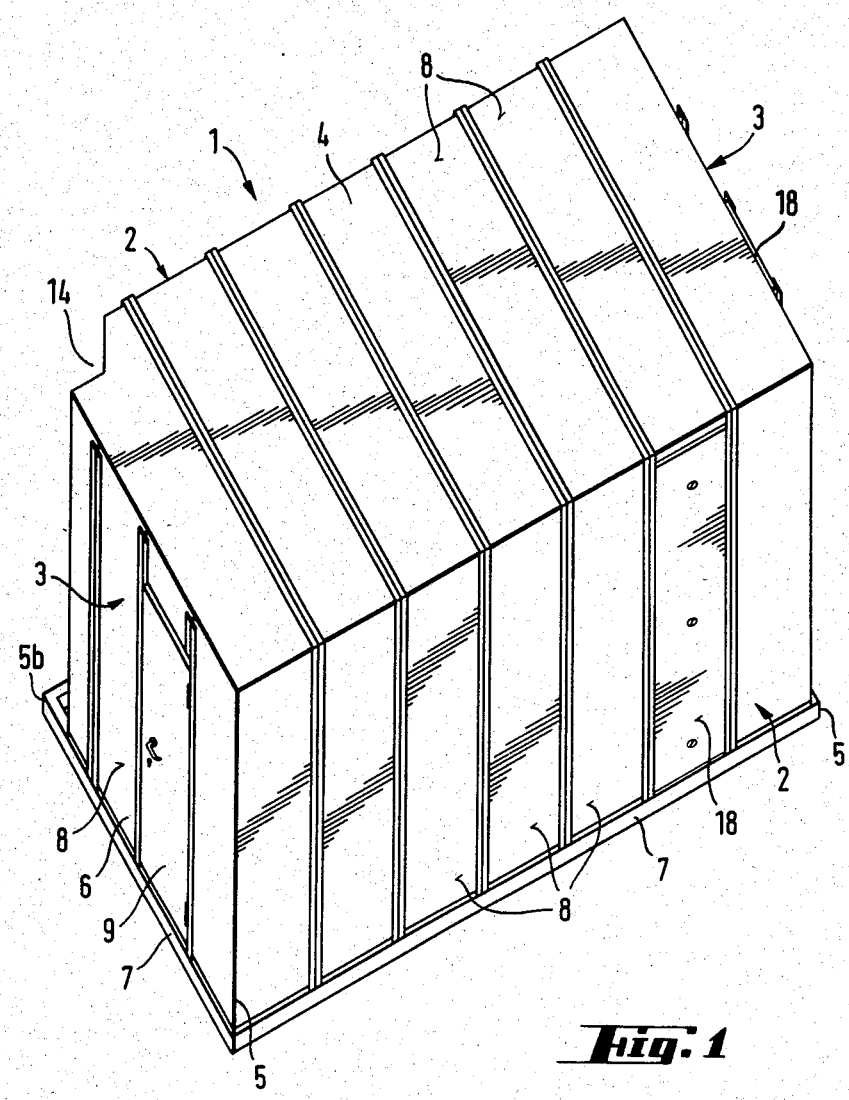
FIG. 1 shows a perspective view of a cabin element according to the invention.

Reference numeral 1 refers to a cabin element, which comprises side walls 2, end walls 3 and a roof 4. The lower corners of the cabin element are indicated by 5. At the lower edge of the walls there is a frame member 7, to which plate cassette members 8 are attached.

The term "cassette" means a unit having an outer casing enclosing the contents of the unit. A "cassette" is inserted into some greater apparatus or unit for cooperation therewith, just like a film cassette, a tape cassette, etc. The exact meaning of the word, in this context, is a wall or ceiling unit having an outer shell of sheet metal and containing normal building insulation material to be inserted into the frame-work of a cabin element.

At one end wall 3 of the cabin element, the cabin door opening is located with its door 9. In the embodiment shown in FIG. 2, the cabin element is provided with a stationary bed 10, which is fastened to walls 2 and 3 in order to improve the rigidity of the cabin element. There is also a lavatory unit 11, which has its own bottom 12 and is provided with stationary sanitary devices 13 attached to the walls. For the pipes of the water supply and sewerage system as well as for heating and air-conditioning, there is a vertical space 14 in a corner 5b.

Figure 2:
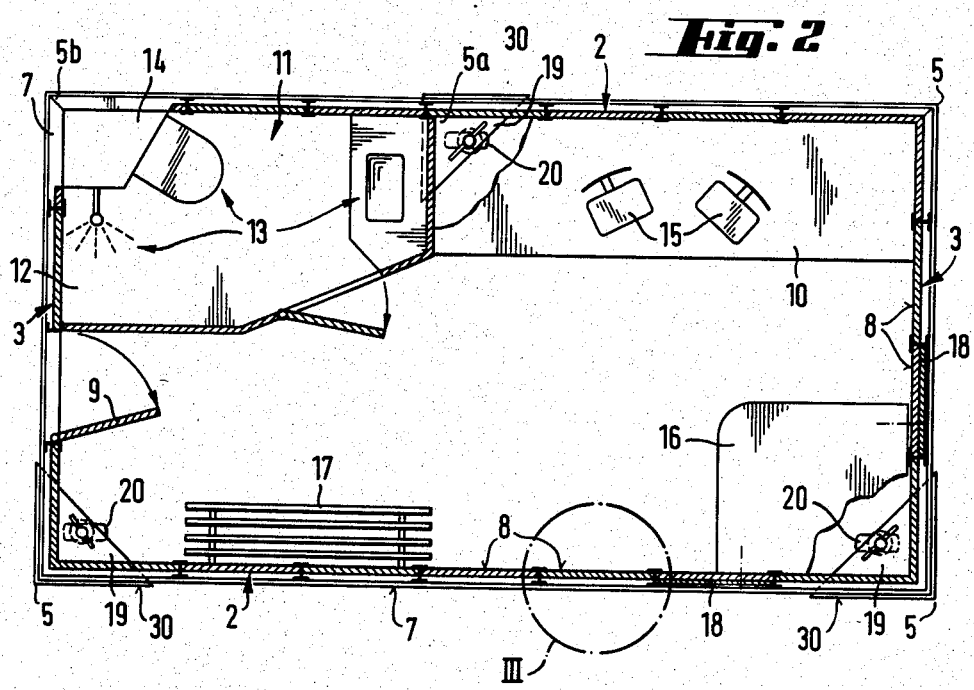
FIG. 2 shows a horizontal section of a cabin element according to the invention.
Figure 3:
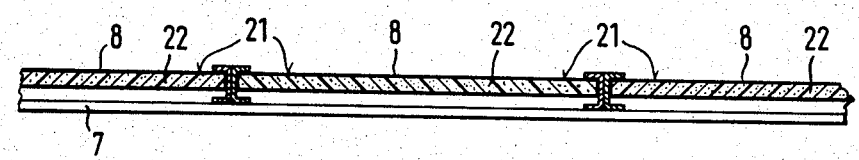
FIG. 3 shows portion III of FIG. 2 on an enlarged scale.

The cabin elements are provided with stationary furniture, or fixtures, some of which are attached to the walls by means of outside support members 18. FIG. 2 shows a stationary table 16 and a clothes rack 17. Non-stationary furniture, such as chairs 15 can be placed, for instance, on bed 10 during the transfer of the cabin element.

Detachable transport members, for instance wheels 20, are located below the cabin element. These members include a body member 19 fitting into corners 5 for supporting the cabin element via its frame members 7.

The plate cassette member 8 of the walls and the roof are joined together by suitable known means. The cassettes comprise a stiffening insulation 22, for instance a stiff mineral wool board or the like.

Figure 4:
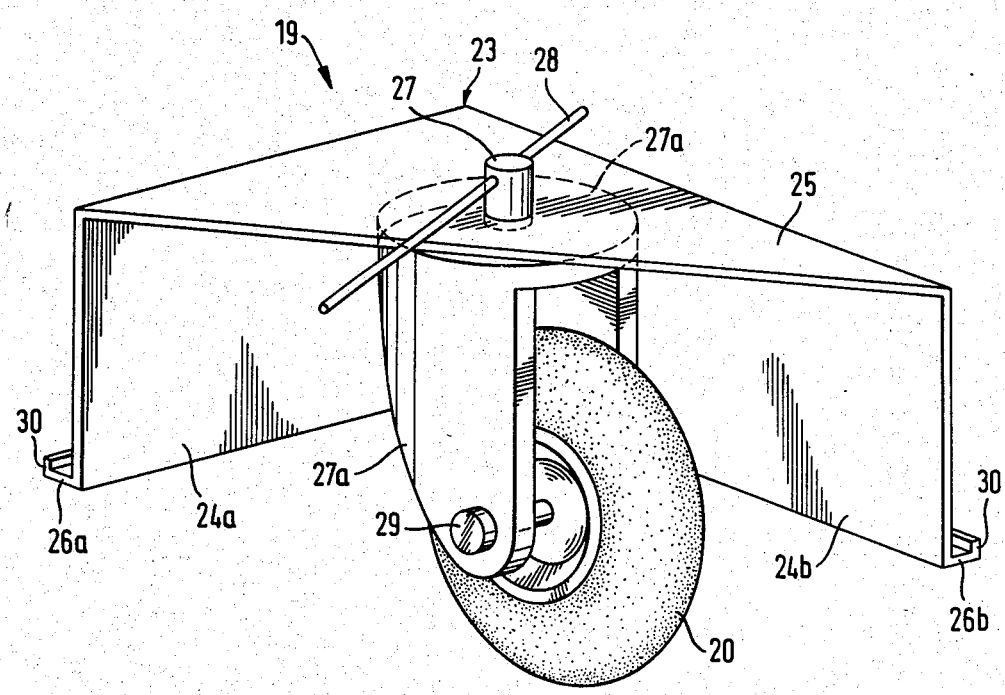
FIG. 4 shows a perspective view of a transport unit.

FIG. 4 shows a transport unit with a body 19 including a top plane 25 and side walls 24a and 24b joined to form a corner 23. The lower edges of side walls 24a and 24b are bent outwards to form U-formed support members 26a and 26b with an outer flange 30 at a distance from side wall 24a which is slightly greater than the width of frame member 7 of the cabin element. The position of the transport unit when carrying a cabin element is shown in FIG. 1. Wheel 20 of the transport unit has a swivel shaft 27 attached to a wheel support 27a, in which the wheel is journalled on a shaft 29. Swivel shaft 27 is turnably journalled at top plane 25. A turning arm 28 can be attached to the end of swivel shaft 27 for turning wheel 20 about the axis of shaft 27.

Figure 5:
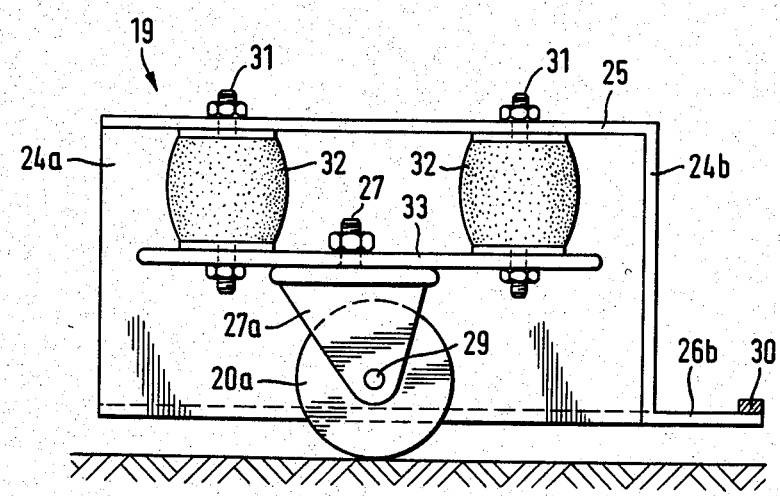
FIGS. 5 and 6 show a side view of another transport unit.
Figure 6:
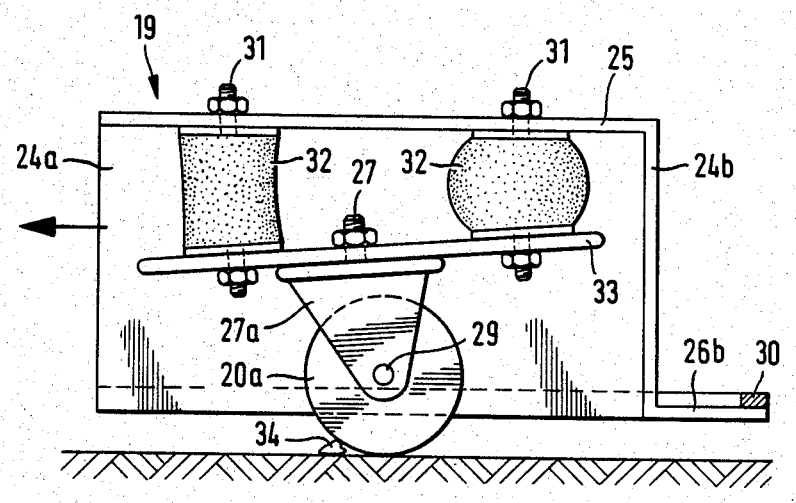

In the embodiment shown in FIG. 5, there is a support plate 33 between wheel support 27a and body 19. This makes the wheel support more flexible. Support plate 33 is movable relative to top plane 25 of body portion 19 of the transport unit by means of guide members 31 and flexible members 32, for instance rubber pads. When steel wheel 20a collides with a small obstruction 34 (FIG. 6), the speed of wheel 20a slows down temporarily. At the same time body portion 19 maintains its speed due to the inertia of the cabin element. As a result, plate 33 slightly tilts under guidance of guide members 31 and flexible rubber pads 32 and wheel 20a climbs over obstruction 34. Due to the small contact surface between steel wheel 20a and the base, wheel 20a turns easily and no turning device attached to the wheel mechanism is necessary.

Figure 7:
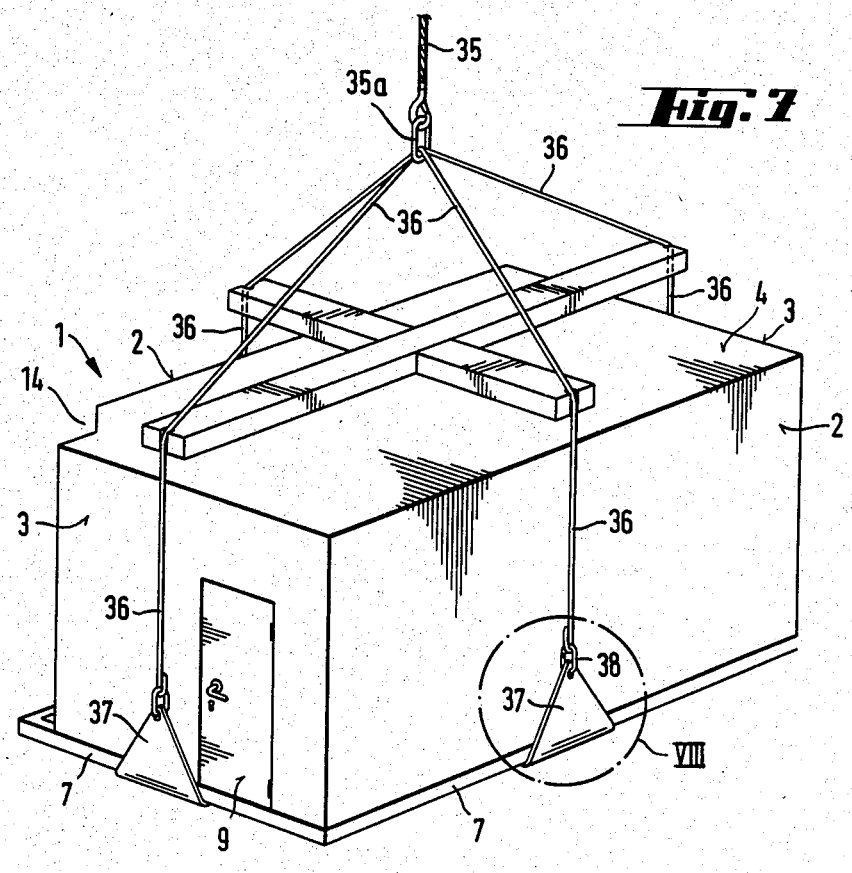
FIG. 7 shows schematically a lifting device for a cabin element.
Figure 8:
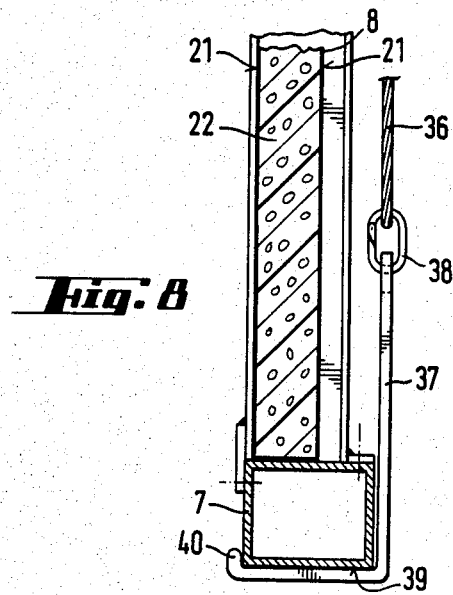
FIG. 8 shows a cross-sectional view of portion VI of FIG. 7.

In order to hoist cabin element 1 by means of a crane or the like, separate hoist members can be used in connection with the cabin element, such as a hoist loop 35a to be supported by a crane hook 35, and, supported by loop 35a, hoist cables 36 with hoist claws 37 (FIG. 7) having a support surface 39 with a side flange 40 (FIG. 8). Since the hoist members extend only slightly outside walls 2 and 3 of cabin element 1, the cabin element 1 is easily lowered on a ship's deck through narrow openings. The weight of a cabin element is preferably 0.5 to 1 ton. Hence, by means of a lever a worker can easily lift one side of a cabin element and apply a hoist claw 37.

The invention is not limited to the embodiments shown, but several modifications thereof are feasible within the scope of the attached claims. The cabin element may comprise, for instance, several cabins located side by side so, that a single side-wall, built-up from plate cassette members, is the common wall for two adjacent cabins. The cabin element will thereby, naturally, comprise both outer element corners and corners confined by two cabins, in the open lower portions of which transport means can be attached.

We claim:

1. In a ship or the like floating structure having a deck, a system for providing said deck of said ship with cabin elements placed directly onto said deck, said system comprising:

self-supporting cabin elements consisting of walls, a roof and an open bottom;

said cabin elements being formed of wall units inserted in a frame;

transport means temporarily connected to the bottom of the walls and inside the walls of said cabin elements, said transport means being operable from the interior of said cabin elements;

said transport means including detachable transport units each comprising a frame having a pair of U-formed support members joined together to form a corner and a wheeled unit; and means temporarily connecting said detachable transport units to said cabin elements with the walls thereof supported in said U-formed support members; and steering control means located mainly within said cabin elements for steering said transport means mainly from the interior thereof.

2. The system of claim 1, wherein said transport units are substantially free of portions extending outside said cabin elements.

3. The system of claim 1, wherein said transport unit is respectively attachable to and detachable from said cabin element from the interior thereof.

4. A method for providing a floating structure with self-supporting box-like cabin elements, including the steps of:

preparing a deck for receiving said cabin elements;

erecting said cabin elements with walls, a roof and with an open bottom;

providing temporary attachment of transport units at the bottom of said walls for making said cabin elements movable on said deck;

supporting said cabin elements with the walls, the roof and the open bottom on said transport units;

operating the transport units from the interior of the cabin elements;

said transport units comprising a frame, a wheeled transport unit and temporary connection means, and temporarily connecting the wheeled transport unit at the lower edge of a cabin element wall proximate to the open bottom of the cabin element;

said transport units including operative means for steering thereof, and including placing said operative means for operation thereof mainly inside the cabin element; and, operating the operative means for steering mainly from the inside of the cabin elements.

5. The method according to claim 4, including attaching plate cassette members on a carrying frame to form the cabin elements.

6. The method according to claim 4, including outfitting the cabin elements with fixtures, and mounting and so attaching the fixtures to the walls of the cabin elements prior to the transfer thereof for increasing the rigidity thereof.

7. A method according to claim 4, including placing the transport units adjacent to a portion where two of the walls meet.

8. A method according to claim 4, including providing said cabin elements with a mainly closed lavatory unit attached to said cabin element for increasing the rigidity of said cabin element.

9. A method according to claim 4, wherein said frame has U-formed support members, and temporarily connecting the U-formed members of said transport units at the lower edges of two adjacent cabin element walls, and including steps carried out from the interior of the cabin element, for respectively connecting to and disconnecting from an edge of a wall of the cabin elements of said transport units.

10. A method according to claim 4, including steps carried out from the interior of the cabin elements for respectively connecting to and disconnecting said transport units from an edge of a wall of the cabin elements.

11. A method for providing a floating structure with self-supporting box-like cabin elements, including the steps of:
preparing a deck for receiving said cabin elements;
erecting said cabin elements with walls, a roof and with an open bottom;
providing temporary attachable and detachable transport units at the bottom of said walls for making said cabin elements movable on said deck;
supporting said cabin elements with the walls, the roof and the open bottom on said transport units; and
operating the transport units from the interior of the cabin elements;
providing steering means on said transport units;
temporarily connecting the mobile transport unit at the lower edge of the cabin element wall proximate to the open bottom of the cabin element; and
operating said steering means mainly from the inside of said cabin elements.

12. A method for providing a floating structure with self-supporting box-like elements, including the steps of:
preparing a deck for receiving said cabin elements;
erecting said cabin elements with walls, a roof and with an open bottom;
employing detachable transport units for transferring the cabin elements;
providing steering means on said transport units and operating said steering means mainly from the inside of said cabin elements; and
temporarily connecting the transport unit at the lower edge of a cabin element wall proximate to the open bottom of the cabin element.

13. A method according to claim 12, including steps carried out from the interior of the cabin elements for respectively connecting to and disconnecting said transport unit from an edge of a wall of the cabin elements, and then placing the cabin elements directly onto said deck.

14. In a ship or the like floating structure having a deck, a system for providing said deck with box-like cabin elements, said system comprising:
self-supporting cabin elements each consisting of walls, a roof and an open bottom;
transport means comprising a plurality of transport units, said transport unit comprising a frame, a transport wheel member and temporary connection means, said transport units including operative means for steering thereof, said cabin elements being supported on said transport units;
said transport unit being temporarily connected at the lower edge of a cabin element wall and proximate to the open bottom of the cabin element;
said operative means of said transport units being placed mainly inside said cabin element; and
said operative means and said transport units being operated mainly from the inside of the cabin element.

15. In a ship or the like floating structure having a deck, a system for providing said deck of said ship with cabin elements placed directly onto said deck, said system comprising:
self-supporting cabin elements consisting of walls, a roof and an open bottom;
transport means temporarily connected to the bottom of the walls and inside the walls of said cabin elements, said transport means being operable from the interior of said cabin elements; and
steering means on said transport means operable mainly from the inside of the cabin elements.

16. The system of claim 15 including fixtures for said cabin elements, said fixtures being fastened to said cabin elements for increasing the rigidity thereof.

17. The system of claim 15, including mainly closed lavatory units so attached to said cabin elements for increasing rigidity of said cabin elements.

18. The system of claim 15, wherein each cabin element weighs from 0.5 to 1.0 tons.

19. The system of claim 15, including means for attachment and detachment of said transport means to and from an edge of said cabin elements such that said transport means are respectively attachable to and detachable from said cabin elements from the interior thereof.

* * * * *